(No Model.) 2 Sheets—Sheet 1.
S. GARWOOD.
VEHICLE.
No. 441,151. Patented Nov. 25, 1890.
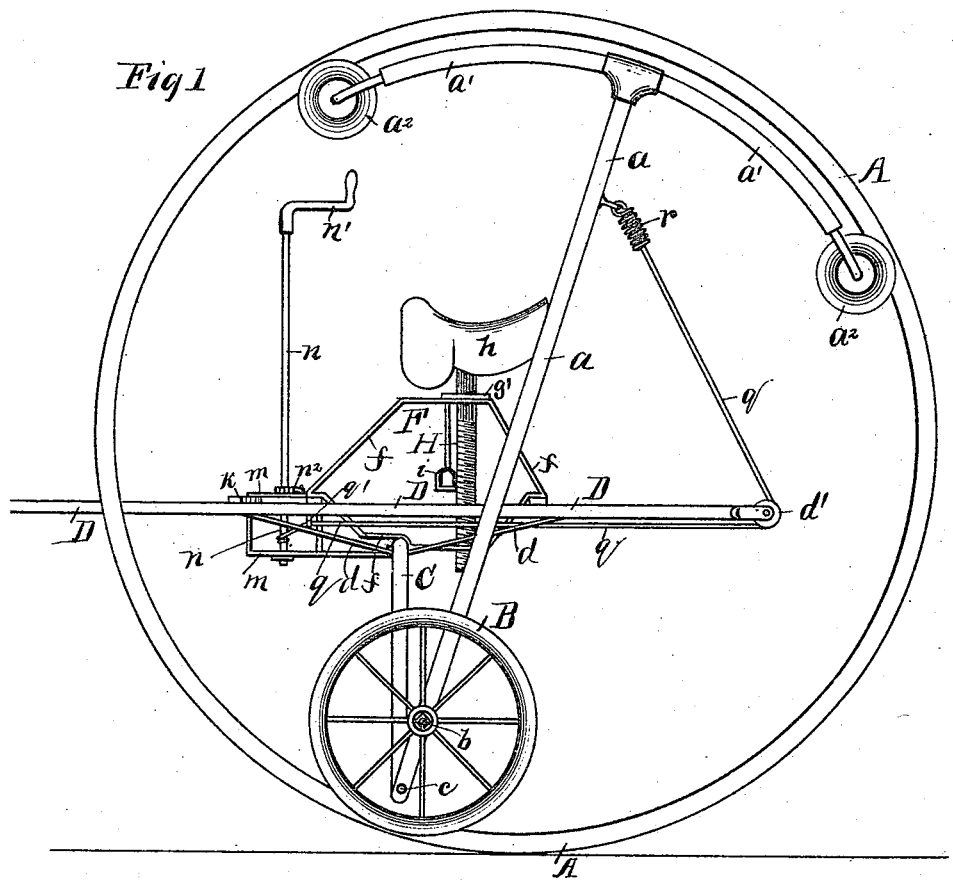
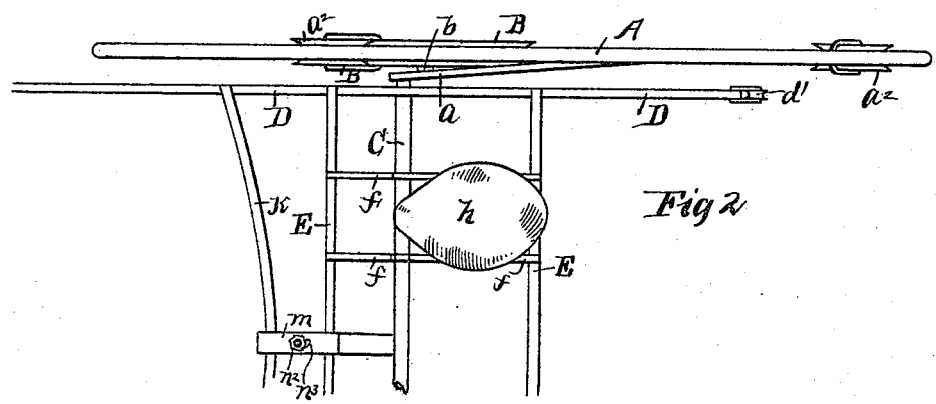
WITNESSES:
John Pavel
Jas. H. Allen.
INVENTOR
Spencer Garwood
BY C. C. Shepherd
ATTORNEY.

(No Model.) 2 Sheets—Sheet 2.
S. GARWOOD.
VEHICLE.
No. 441,151. Patented Nov. 25, 1890.
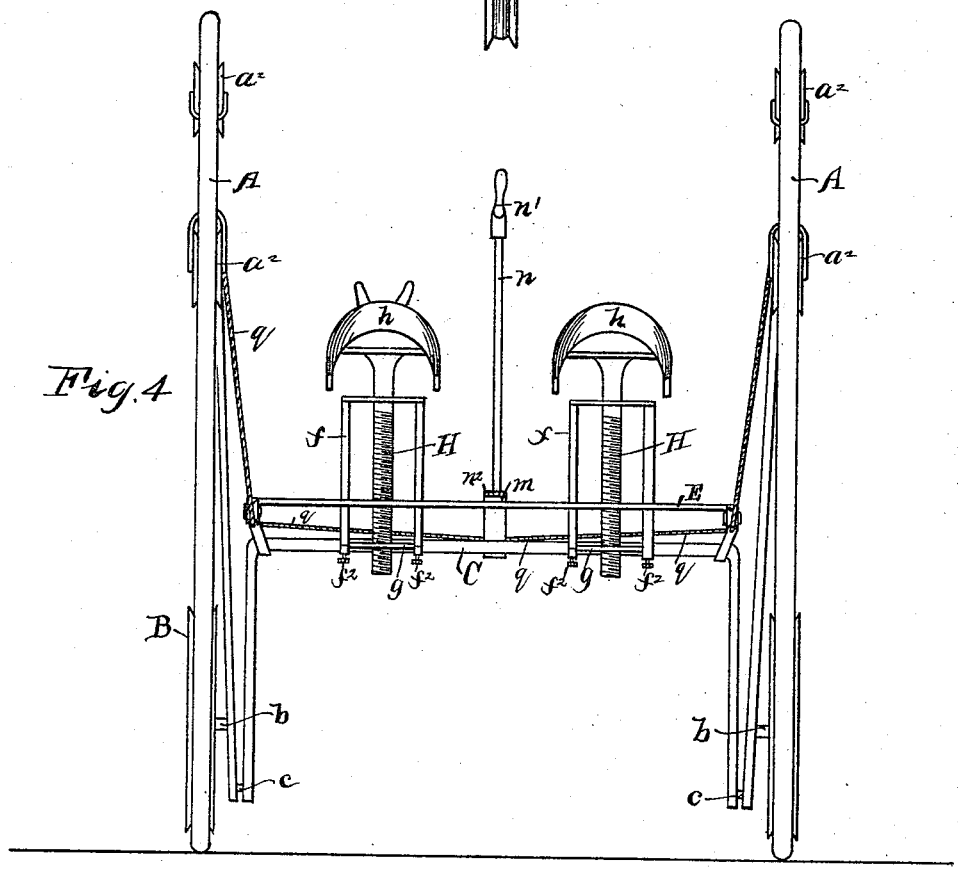
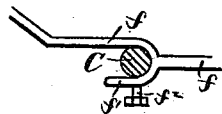
WITNESSES:
John Fravel
Jas. H. Allen
INVENTOR
Spencer Garwood
BY C. C. Shepherd
ATTORNEY.

UNITED STATES PATENT OFFICE.

SPENCER GARWOOD, OF MILFORD CENTRE, OHIO.

VEHICLE.

SPECIFICATION forming part of Letters Patent No. 441,151, dated November 25, 1890.

Application filed March 21, 1890. Serial No. 344,755. (No model.)

*To all whom it may concern:*

Be it known that I, SPENCER GARWOOD, a citizen of the United States, residing at Milford Centre, in the county of Union and State of Ohio, have invented a certain new and useful Improvement in Vehicles, of which the following is a specification.

My invention relates to the improvement of vehicles of that class wherein supporting-wheels are made to run within a large track-wheel or ground-wheel, and has particular relation to the improvement of the inventions shown in my former patent, No. 418,611, and in my application for patent, Serial No. 336,506.

The objects of my present invention are to produce in this class of vehicles a cart or sulky of superior construction, to so construct my improved vehicle as to admit of its use in connection therewith of one or more saddles which shall be capable of both lateral and vertical adjustment, to admit of the use of any well-known or desired form of seat in connection therewith, to produce superior means for elevating the supporting-wheels past the center of the diameter of the ground-wheels, to provide the diameter-arm with a top or cross arm of superior form, to so form the contact or bearing-surfaces of the ground and supporting wheels as to create but slight friction between the same and to decrease the liability of their becoming clogged by pebbles or other obstacles, to so support the vehicle-frame as to relieve it from jolting, to so construct the running parts of my improved vehicle as to admit of the frame or body being supported at a high or low elevation between the ground-wheels, and to so construct said vehicle in a simple, neat, and compact form. These objects I accomplish in the manner illustrated in the accompanying drawings, in which—

Figure 1 is a side elevation of my improved vehicle. Fig. 2 is a plan view of a portion of the vehicle. Fig. 3 is a detail view of one of the supporting-wheels in elevation. Fig. 4 is a rear view of the vehicle, and Fig. 5 is a detail view showing a transverse section of the axle and the connection of the seat-frame therewith.

Similar letters refer to similar parts throughout the several views.

A represents the large track-rings or ground-wheels, which, as shown, are round in cross-section.

Within the wheels A and supported upon the inner periphery thereof are the small vehicle-supporting wheels B. The periphery of each of these wheels B is grooved, as shown, the bearing-face of said periphery being convex in cross-sections. The hub of each of the wheels B is provided with a short spindle $b$ pivoted therein. The inner projecting end of this spindle $b$ is connected with the lower portion of a diameter-arm $a$, which, extending upwardly to a point immediately beneath the upper portion of the track-wheel A, has its upper end rigidly connected with the central portion of a curved arm $a'$, which extends in the arc of a circle beneath the upper portion of the track-ring.

Pivotally connected with each end of the arm $a'$ is a small friction or bearing wheel $a^2$, having a grooved periphery, said friction-wheel bearing and running against the inner side of the track ring.

The lower terminations of the diameter-arms $a$ are below the hubs of the wheels $b$, and said arms $a$ are each provided with an inwardly-projecting pin $c$ at their lower extremities.

Pivotally connected with these pins $c$ are the ends of an axle C, which extends between said wheels of the vehicle and is bent approximately to the form of an inverted U.

D represents the shafts of the vehicle, which, projecting forwardly in the usual manner from the front of the vehicle, have their rear portions extending rearwardly between the ground-wheels and between the diameter-arms and over the axle. Each of the shafts is connected with said axle and supported therefrom by means of a brace or hanger $d$, which is made to depend from the under side of the shaft. The rear portions of the shafts terminate at points in rear of the central portions of the ground-wheel. The rear end of each of these shafts has pivotally supported therefrom a small friction-pulley $d'$.

Extending transversely between the shafts on opposite sides of the axle are rigid cross arms or rods E.

F represents a seat-supporting frame, each of which consists of two frame-rods bent approximately to an oval form, and having its under side extending between cross-arms E and supported on the axle C. These frame-pieces $f$ are made laterally adjustable upon the axle by having on their under side a downwardly and thence forwardly bent lug $f'$, between the forwardly-extending portion of which and the body of the frame-rod passes the axle, as shown. Through each of these lugs $f'$ is made to pass upward a set-screw $f^2$, which by contact with the axle binds the seat-frame in connection therewith. If desired, however, the axle might be made to pass through a socket formed in each of said frame-pieces and set-screws made to pass through the socketed portions of the frame.

Connecting the lower portions of the frame-pieces $f$, in the rear of the axle, is a cross-piece $g$, a similar cross-plate $g'$ being made to connect the upper portions of the frame-pieces $f$ at a point vertically above the cross-plate $g$.

H represents a vertical saddle-supporting screw, which passes loosely through a hole formed in the cross-plate $g'$, and thence through a hole formed in the lower cross-plate $g$. The latter being a thin plate, the circular edge produced by formation of the screw-hole formed therein operates as a screw-thread to engage the threads of the screw H. Upon the upper projecting end of this screw is supported centrally a suitable saddle $h$.

Supported from the upper side of each of the pieces $f$ is a suitable stirrup $i$.

$k$ represents a shaft cross-piece, which connects the two shafts in front of the forward cross-piece E.

Pivotally supported in bearing-pieces $m$, which connect the central portions of the forward cross-arms E and $k$, is a vertical brake-shaft $n$, provided at its upper end with a suitable handle $n'$. This brake-shaft is made to carry a ratchet-wheel $n^2$, with which is adapted to engage a pawl $n^3$, pivoted upon the upper side of the upper frame-piece M.

Connected with the brake-shaft $n$ are the corresponding ends of two suitable cords or chains $q$, which extend therefrom toward opposite sides of the vehicle. Each of these cords passes through an eye $q'$, formed on the under side of the shaft toward which it extends. From this eye the cord extends rearwardly and passing over the pulley $d'$ at the shaft end extends diagonally upward and forward and has its end secured to the diameter-arm, as shown.

In using my device the weight of the body or the vehicle-frame and the weight of the riders may be made to fall upon the ground-wheels at a point in front of the center thereof, as shown in Fig. 1 of the drawings. In order to accomplish this the crank-shaft may be rotated to wind thereon the cord $q$. This taking up of the cords $q$ by the brake-shaft will operate to pull downwardly and rearwardly the upper portions of the diameter-arm $a$, and this movement of the diameter-arm will, through its connection with the supporting-wheels, operate to force the latter forward to points past the centers of the ground-wheels, as shown. In this movement the friction-wheels $a^2$ travel against the inner side of the ground-wheels and are prevented from any tendency to bind against said ground-wheels or to slip therefrom by the arms $a'$, the curves of which conform to the curves of the ground-wheels. The supporting-wheels having been thus thrown forward, they may be held in this position by preventing the unwinding of the brake-shaft, which is accomplished by causing the pawl $n^3$ to engage with the ratchet $n^2$.

By the operation above described it will be seen that the weight, being thrown past the center of the ground bearing-point of the ground-wheels, will create a leverage upon said ground-wheels which will greatly aid the latter to revolve. Owing to the spring-connection of the cords $q$ and the diameter-arms, it will be seen that the rider or riders may be greatly relieved from the effect of any jolting or jarring to the vehicle.

The bodies of the ground-wheels being round in cross-section and the bearing peripheries of the supporting-wheels being convex, it will be seen that the friction between the ground and supporting wheels will be exceedingly slight, and that pebbles and other small articles which might otherwise become wedged between the ground and supporting wheels will be forced to one side.

Although but one seat or saddle frame has been described, it is obvious that a second seat might be used, as shown in the drawings. These saddles may be adjusted vertically by turning their supporting-screws H, which, through their engagement with the thin cross-plate $g$, will operate to raise or lower the seat. By loosening the set-screw $f^2$ the seat-frame may be moved laterally to the desired position on the axle.

Although saddles are shown and described, it is obvious that any desired form of seat might be supported upon the axle, such as the ordinary form of vehicle-seat.

In case it is desired, a lower form of vehicle-frame than that herein shown might be employed and a buggy-body supported thereon. This change from a high to a low form, while necessitating some slight changes in the details of construction of the vehicle-frame herein shown and described, would not result in a departure from the principles of my invention.

If desired, a suitable canopy or cover may be secured between the arms $a'$ as a protection for the riders.

Having now fully described my invention, what I claim, and desire to secure by Letters Patent, is—

1. In a vehicle, the combination, with the ground-wheels, of the supporting-wheels connected by an axle, the diameter-arms pivotally connected with said supporting-wheels, and the two cross-arms on said diameter-arms curved to conform to the curves of the ground-wheels, substantially as set forth.

2. The combination, with a vehicle-frame and its shafts and axle, of a seat-supporting frame adjustably supported, as described, upon the axle, and a saddle H, supported upon a screw, said screw being adjustably supported, as described, by said seat-frame, substantially as set forth.

3. In a vehicle, the combination, with the large ground-wheels A, supporting-wheels B running therein, diameter-arms $a$, pivotally connected with wheels B and having top cross-arms $a'$, carrying friction-wheels $a^2$ and axle C, connecting diameter-arms $a$, of the shafts D, having guide-pulleys $d'$, brake-shaft $n$, supported, as described, in the vehicle-frame, cords $q$, connecting, as described, the brake-shaft, and arms $a$ through springs $r$, substantially as set forth.

SPENCER GARWOOD.

In presence of—
C. C. SHEPHERD,
L. DONALDSON, Jr.